Dec. 29, 1953      L. M. BARKER ET AL      2,664,199
FLOTATION RECOVERY OF MOLYBDENITE
Filed Aug. 27, 1952

INVENTORS
Lyle M. Barker
BY  Orel E. Young

ATTORNEY

Patented Dec. 29, 1953

2,664,199

UNITED STATES PATENT OFFICE 2,664,199

FLOTATION RECOVERY OF MOLYBDENITE

Lyle M. Barker, Clifton, and Orel E. Young, Morenci, Ariz., assignors to Phelps Dodge Corporation, New York, N. Y., a corporation of New York Application August 27, 1952, Serial No. 306,638

12 Claims. (Cl. 209—167)

This invention relates to the seperation of molybdenite ($MoS_2$) from ores also containing sulfides of other metals. More particularly, this invention relates to the separation of molybdenite from flotation concentrates containing molybdenite and sulfides of other metals, particularly iron and copper.

The major source of metallic molybdenum is from molybdenite. Molybdenite occurs most frequently associated with sulfides of other metals, such as copper and iron, and is recovered with these other sulfides by concentration processes. Because the molybdenite commonly occurs in low concentration in these ores, it is only a minor constituent of the copper-iron concentrates, and its recovery presents a major problem. The present invention represents an efficient, simple and economical solution of this problem.

It has been recognized that the collector reagents such as organic thiophosphates or xanthates, commonly used for producing the copper concentrates, leave a residue in the concentrates which interferes with subsequent recovery of molybdenite by the usual flotation methods. To obviate this difficulty, such concentrates containing molybdenite have been subjected to a roasting or steaming treatment before the molybdenite is recovered. Such heating treatments are expensive and impractical unless the tonnage to be treated is relatively small and rich in molybdenite. Also, even under the best conditions, considerable amounts of molybdenite are lost and the efficiency of molybdenite recovery is not as high as would be desirable.

A molybdenite concentrate must contain a very high proportion of $MoS_2$ and no more than small amounts of copper and other values in order to be usable directly and without further processing in the production of molybdenum. For example, a molybdenite concentrate must contain at least 85% $MoS_2$ and less than 1.5% Cu in order to be considered high grade.

It is a primary object of this invention to provide a method whereby high grade molybdenite concentrates can be obtained directly and efficiently by flotation treatment of a copper concentrate without any preliminary roasting, steaming or heating.

A further object is to provide such a method in which only inexpensive reagents are used to float the molybdenite selectively.

Another object is to provide such a flotation procedure for producing high grade molybdenite concentrates from copper concentrates containing as little as 0.25% of $MoS_2$, and still achieve a high efficiency or percentage recovery of the molybdenite in the original material processed.

Other objects and advantages of the invention will be apparent from the disclosure which follows and from the flow sheet in the appended drawings.

Figure 1:
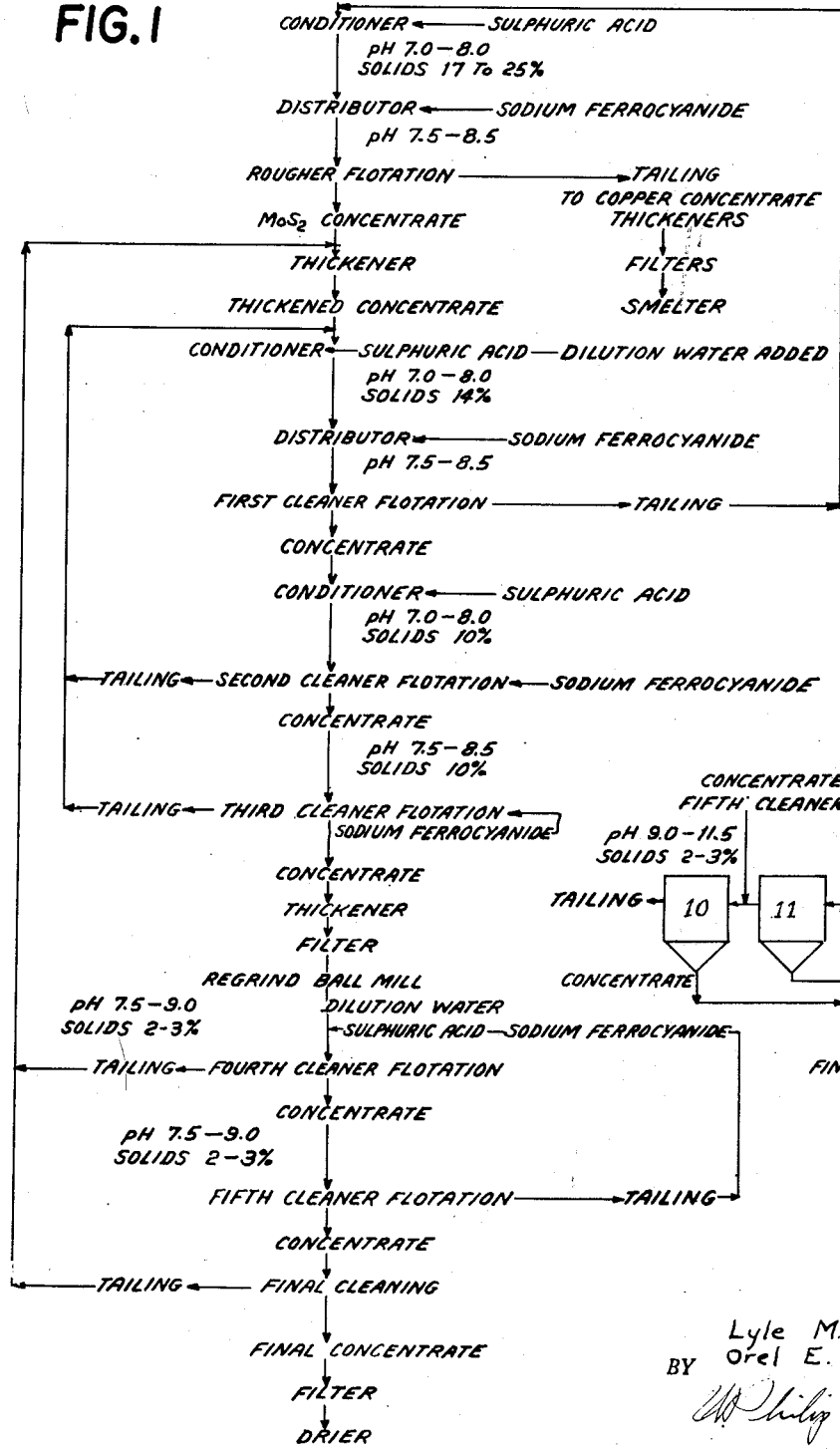
Figure 1 is a flow diagram of the preferred process of the invention.

We have discovered that copper concentrates containing relatively large amounts of copper and iron sulfides and low amounts of molybdenite can be processed directly by flotation methods without any preliminary chemical or heat treatment to obtain a high grade molybdenite concentrate. Furthermore, over 70% of the $MoS_2$ in the original copper concentrate can be recovered in this form, and the only reagents required are a ferrocyanide and sodium cyanide in addition to an acid, such as sulfuric acid, where pH adjustments are necessary.

The initial copper concentrate which is processed may have been obtained by using the conventional thiophosphate or xanthate collector and frothing agents, and may contain as little as 0.25%, or even less, of $MoS_2$, with 25% or more each of Cu and Fe in the form of a mixture of sulfides.

The process of our invention consists essentially of a rougher flotation and several cleaning stages during which an iron cyanide compound is used as reagent, and a final cleaning with an alkali metal cyanide. Throughout the procedure, the pH is carefully controlled and adjusted where necessary by acid addition, and the pulp density is controlled and varied from stage to stage. The tailing from the rougher flotation contains most of the copper values and becomes the copper concentrate that goes to the copper smelter. The concentrate from the rougher flotation contains the bulk of the molybdenite and is gradually upgraded as it progresses through the various cleaning stages until the final high grade molybdenite concentrate is obtained from the last cleaning operation. The tailings from the first cleaner flotation are returned to the feed for the rougher flotation, while the tailings from later cleaning stages are returned to other points in order to provide a closed circuit operation.

The copper concentrate may be used as feed just as it comes from the copper concentration plant. Such a concentrate usually has a high pH and contains the residues from additions of lime, collector and frothing agent, during the flotation treatment of the original ores. Water and acid are added in a conditioner to adjust the pH to about 7.0 to 8.0 and the pulp density to about 17% to 25% solids. The conditioner may consist of any suitable tank or container in which the pulp is kept under agitation. The pulp is then fed by any suitable distributor into one or more rougher flotation cells and the reagent, preferably sodium ferrocyanide, is added as the pulp enters these cells. The reagent addition raises the pH of the pulp somewhat so that it has a pH of about 7.5 to 8.5 during the rougher flotation.

The concentrate from the rougher flotation then passes through several cleaner flotation stages with the pulp adjusted before each stage to a lower density. The concentrate in each case is diluted when necessary in a conditioner to the requisite pulp density and where necessary its pH is again adjusted in the conditioner to about 7.0 to 8.0 before each addition of ferrocyanide. After several such cleaner stages operating with pulp densities of about 10 to 14%, the concentrate is thickened, filtered, reground in a ball mill or the like and again cleaned. One or more cleaner flotations may be used after regrinding and are preferably carried out with sodium ferrocyanide reagent at a lower pulp density than in the earlier cleaning stages. At this stage, it is preferable to use a pulp density of the order of 2 to 3% solids and the pH may run higher, preferably in the range of about 7.5 to 9.0.

The concentrate thus obtained still contains excessive amounts of copper sulfides and is subjected to a final cleaning with sodium cyanide reagent at a substantially higher pH, such as 9.0 to 11.5. The sodium cyanide is alkaline enough to raise the pH of the pulp to this range without addition of other reagents. This final cleaning appears to be most effective in depressing covellite, while the earlier cleaning operations depress and separate most of the chalcocite and some of the covellite.

We have found that although commercial sodium ferrocyanide is ideal for use as a reagent in the rougher flotation and following cleaner flotations because of its low cost, other water soluble iron cyanide compounds such as the alkali earth ferrocyanides or ferricyanides may be used in the final cleaning stage in place of sodium ferrocyanide.

The number of iron cyanide cleaning stages employed will depend, of course, on the composition of the copper concentrate to be processed, including the amount of molybdenite contained in it and the amount and nature of the associated copper and iron sulfides. Also, if desired, the process can be simplified somewhat at the expense of efficiency in the molybdenite recovery.

The equipment used in the different operations can be conventional flotation cells such as the standard Fagergren, Denver or Jetair cells, and it is convenient to arrange them in banks as will be readily understood by those skilled in the art.

We have also found that the effect of the iron cyanide, such as sodium ferrocyanide, diminishes with time so that it is desirable to add this reagent to the pulp as it goes into the flotation cells, in order to obtain maximum effectiveness. This is particularly important in the rougher flotation and the earlier cleaner flotations. The pH adjustments must be made to provide the proper pH during the actual flotation operations. This can be done most easily by adding acid as necessary in a conditioner tank, the amount of acid added being dependent upon the alkalinity of the materials flowing into the conditioner in each case. The pH of the pulp in these conditioners is not critical but must be adjusted to make allowance for the effect on pH produced by the addition of reagent as the pulp from the conditioner flows into the flotation cells.

Residual frothing agents in the copper concentrates may cause trouble in the rougher and earlier cleaning flotations by creating excessive froth in the cells. We have found, however, that this can be controlled adequately by one or two thickening operations followed by dilution with frother-free water. Residual collector reagents in the pulp do not appear to interfere with the recovery of molybdenite by our process.

The pulp densities found preferable are as follows: The rougher flotation is carried out at pulp density of about 20% solids. If the solids content is substantially below 17% at this stage, the coarser particles of the pulp tend to settle and disrupt the pulp flow. If the solids exceed 25%, frothing may become excessive and too much of the copper and iron sulfides will be carried over into the molybdenite concentrate. These limits may not be critical, however, for all copper concentrates, but will vary somewhat depending on the fineness of the initial concentrate feed and the amount of residual frother contained in it.

For the first cleaner flotation, a much lower pulp density is desirable. We have found that a solids content of about 12 to 18% and preferably around 14% is best for this first or primary cleaning.

Subsequent cleaning operations may be carried out at a pulp density of about 8 to 12% solids, preferably around 10%. The last cleaning with ferrocyanide, preferably carried out after regrinding to liberate molybdenite attached to gangue materials, is carried out at a still lower density. In this case, a pulp density of about 2 to 3% solids is best and it may be necessary to add some frothing agent such as methyl isobutyl carbinol, or the like, because of the preceding thickening and filtering. The pulp density then does not have to be changed for the final cleaning with alkali cyanide.

While other standard equipment may be used, we have found that the Denver type mechanical flotation cells work very well for these last two cleaning stages when the pulp is low in solids.

In order to disclose more clearly the nature of the present invention, the following specific example illustrating the typical preferred exemplification of the process will hereinafter be described. It should be understood, however, that this is done solely by way of example and is intended neither to delineate the scope of the invention nor limit the ambit of the appended claims.

Example

The following is an example of our process as applied to a copper concentrate obtained from a copper ore mined in Morenci, Arizona. The concentrate is produced from the original ore by an initial flotation using lime, organic thiophosphate and a standard frothing agent as the reagents. Our process begins with this copper concentrate, which may contain approximately 0.25% molybdenite, together with copper and iron sulfides in amounts assaying about 25 to 30% each of copper and iron.

We first prepare the copper concentrate for a rougher flotation by transferring the concentrate to a conditioning tank where the pH of the solution is lowered to 7.0 to 8.0 by addition of sulfuric acid. Copper concentrates usually have a higher pH well in the alkaline range of 10.0 to 12.0. The pH may be adjusted by the use of any acid but we prefer the mineral acids because of their low cost and availability. For our operations, we prefer the use of sulfuric acid. However, any acid which is not unduly oxidizing in nature is satisfactory.

In this first conditioner, the pulp density is adjusted by adding water to a concentration of total solids in the range of between 17 to 25% solids, preferably around 20% solids.

Just prior to introducing the conditioned concentrate pulp into rougher flotation cells, a quantity of a solution of sodium ferrocyanide is added. We find it desirable to make the addition of the sodium ferrocyanide at the feed inlet of the first cell of each of the flotation banks, or to the pulp distributor which supplies a flow of pulp from the conditioner tank into the flotation cells.

The ferrocyanide is added in an amount which will permit some flotation of copper and iron sulfides at the last flotation cell in each bank so as to obtain maximum flotation and recovery of the molybdenite. We have found that a desirable amount of sodium ferrocyanide for the rougher flotation stage is about 0.33 pound of the reagent per ton of original copper concentrate treated.

The conditioned concentrate or pulp and reagent are fed into a bank of flotation cells, preferably of the mechanical agitation type such as the standard Fagergren cells. The number of cells will depend, of course, on the volume and tonnage of concentrates to be treated. These cells are connected in series.

The tailings from this rougher flotation which are high in copper content are collected and subjected to thickening to remove excess amounts of water. The thickened tailings are filtered and the processed copper concentrate thus obtained is sent to the smelter for production of metallic copper.

The concentrate from the rougher flotation step (with a molybdenite concentration of perhaps 1.35%) is mixed with tailings from the fourth and final cleaning operations and goes to a thickener, such as a Dorr-type thickener, to remove excess quantities of water containing frothing agent. The thickened material is then introduced into a second conditioning tank where further sulfuric acid is added to adjust the pH to between 7.0 and 8.0 and water is added to reduce the pulp density to around 14% total solids.

The pulp from this second conditioner is then introduced along with a solution of sodium ferrocyanide in an amount of approximately 0.24 pound of reagent per ton of original copper concentrate into another bank of flotation cells, where the first or primary cleaning operation is performed. The concentrate from this primary cleaning flotation step (which may now contain approximately 10% molybdenite, 45% copper and 12% iron) is prepared for several subsequent flotation steps by transfer to a third conditioning tank. The tailings from the primary cleaner are recycled to the first conditioning tank.

One conditioning is suitable for the next two cleaner flotation steps. In this third conditioning tank, the pH is adjusted again with sulfuric acid to lower the pH range to 7.0 to 8.0 and the solids are reduced to around 10% by the addition of more water. Further sodium ferrocyanide is added simultaneously with the introduction of the pulp from this third conditioner into another bank of flotation cells. A suitable amount of sodium ferrocyanide is in the order of .071 pound per ton of original copper concentrate. The concentrate from this secondary flotation step then goes directly into another bank of flotation cells where the tertiary cleaning operation is carried out. Another portion of ferrocyanide is added to the feed of the tertiary cleaners, the amount usually being the same as used for the secondary cleaning. At the end of the tertiary cleaning step, the molybdenite in the concentrate has increased to approximately 30% and the copper and iron have diminished to approximately 31 and 9%, respectively. The tailings from the secondary and tertiary cleaning operations are combined and returned to the second conditioning tank.

Prior to conducting the fourth or quaternary cleaner flotation step, we find it advantageous to subject the concentrate to a regrinding in order to effect an optimum separation and recovery of the molybdenite. The concentrate from the tertiary cleaning is first thickened to remove a large percentage of the agents which have been concentrated by the preceding flotation steps. Also, the thickening removes a large part of the water in the concentrate and prepares the concentrate for filtration and subsequent grinding in a ball mill. We find that frequently the molybdenite is attached to, or connected with, gangue material. If this gangue material is not freed from the molybdenite particles, the molybdenite is either lost during subsequent treatment, or if it is recovered, it carries gangue material with it, resulting in undue contamination of the final product.

The ground concentrate is diluted with fresh water to produce a suspension containing approximately 2.5% total solids, and sufficient acid is added to adjust its pH to within the range of 7.5 to 9.0 after sodium ferrocyanide addition. If necessary, frothing agents may be added at this time. A suitable frothing agent is methyl isobutyl carbinol, although many others known to the art may be used satisfactorily. We prefer to use the Denver type flotation cell at this stage, although other type cells may be used satisfactorily. Sodium ferrocyanide solution in the amount of 0.385 pound per ton of original copper concentrate is added simultaneously with the introduction of the pulp into a bank of flotation cells constituting the fourth or quaternary cleaning. The tailing from the fourth cleaner stage, as mentioned above, is returned and mixed with the rougher concentrate going to the thickener preceding the first cleaner stage. The concentrate from the fourth cleaner stage may be passed directly without any treatment or addition of reagents to a bank of flotation cells constituting the fifth cleaner stage. The tailing from this fifth stage is simply recycled to constitute part of the feed for the fourth cleaner stage. The concentrate collected from this fifth cleaning flotation is found to contain approximately 59% molybdenite and the concentrations of copper and iron have been reduced to around 18 and 4%, respectively.

Figure 2:
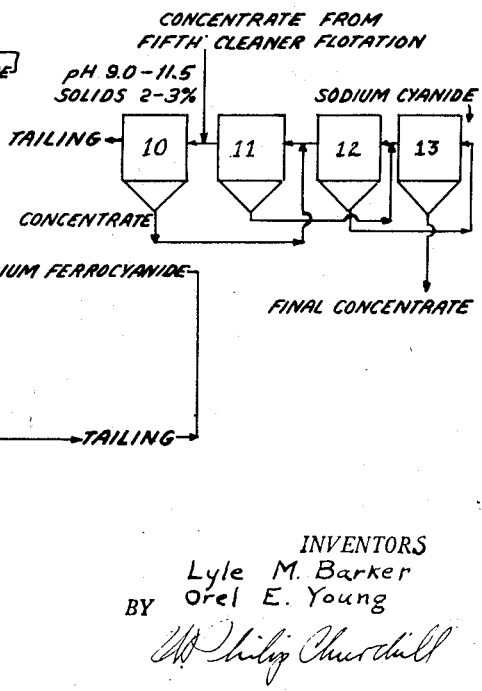
Figure 2 is a flow diagram showing the countercurrent flotation cells used in the final cleaner flotation step.

The concentrate from the fifth cleaner is then ready for the final flotation cleaning step. We have found that a water-soluble cyanide is necessary in this final step in order to effect efficient removal of the residual amounts of copper and iron sulfides contained in the concentrate. We prefer the use of sodium cyanide but the other alkali-metal cyanides are equally satisfactory. For this final flotation step, we again obtain best results with the Denver type flotation cells but we find that in order to obtain maximum utility for the sodium cyanide it is advisable to conduct the flotation using counter-current flow. This procedure is shown in Figure 2 of the drawings where the flow of materials is illustrated by the diagram. The concentrate from the fifth cleaner flotation is added to the tailing being introduced to the last cell (10) from the next to the last cell (11). The concentrates produced in cells 10, 11 and 12 are fed into the preceding cells 11, 12 and 13, respectively. The sodium cyanide is added to the concentrate flowing into the first cell (13). In this manner, the molybdenite-rich concentrate is introduced progressively through an environment of increasing cyanide concentration. It is apparent that as the sodium cyanide flows through the bank of flotation cells, it becomes diluted by the addition of the water introduced with the concentrate from the fifth cleaner flotation cells. It is essential for maximum depression of the copper and iron sulfides which have escaped depression in the preceding operations that the final concentrate flow in the direction of the richest concentration of the sodium cyanide. It will be observed that by this process, maximum efficiency is had of the more expensive sodium cyanide reagent. The amount of sodium cyanide added may vary. However, for optimum results, we find that a fairly concentrated solution of approximately 0.75 pound of sodium cyanide per ton of original copper concentrate is most satisfactory.

The final flotation step using the sodium cyanide produces a concentrate having in the range of 85% or more molybdenite and with greatly diminished amounts of copper and iron, these being in the order of 1.5% and 3.0%, or less, respectively. We have obtained consistently by this process in one operation a molybdenite concentrate containing 85 to 90% molybdenite and less than 1% Cu with a recovery of more than 70% of the total MoS₂ in the original feed.

The concentrate produced from the final flotation step which is almost entirely molybdenite may then be suitably filtered, dried and stored for subsequent recovery of molybdenum or marketed as desired.

Illustrating the quantitative aspects of the process described in the foregoing example showing the analysis of the feed, tailing and concentration at different stages of the operation is Table I which follows:

*Table I*

| | Feed, percent | | | Tailing, percent | | | Concentrate, percent | | |
|---|---|---|---|---|---|---|---|---|---|
| | MoS₂ | Cu | Fe | MoS₂ | Cu | Fe | MoS₂ | Cu | Fe |
| Roughing | 0.217 | 25.52 | 28.0 | 0.144 | 25.58 | 27.5 | 1.348 | 40.58 | 19.5 |
| Primary Cleaning | 1.348 | 40.58 | 19.5 | 0.933 | 40.87 | 19.0 | 10.190 | 44.69 | 12.2 |
| Second Cleaning | 10.190 | 44.69 | 12.2 | 3.244 | 49.93 | 12.4 | 14.950 | 43.28 | 11.0 |
| Third Cleaning | 14.950 | 43.28 | 11.0 | 5.555 | 51.03 | 11.2 | 29.90 | 31.41 | 9.4 |
| Fourth and Fifth Cleanings | 29.90 | 31.41 | 9.4 | 12.04 | 39.76 | 12.6 | 59.20 | 18.64 | 4.3 |
| Final Cleaning | 59.20 | 18.64 | 4.3 | 33.70 | 34.58 | 6.7 | 85.23 | 0.70 | 3.0 |

Also, examining the results from a plant applying a flow sheet, such as that of the example, as to the assays and distribution of molybdenite, copper and iron in the feed, final concentrate and tailing, we have found the following to be the results:

*Table II*

| | Weight, percent | Assays | | | Distribution, percent | | |
|---|---|---|---|---|---|---|---|
| | | MoS₂ | Cu | Fe | MoS₂ | Cu | Fe |
| Copper Concentrate Feed | 100.000 | 0.331 | 26.51 | 25.6 | 100.00 | 100.00 | 100.00 |
| Roughing Tailing | 99.735 | 0.100 | 26.58 | 25.7 | 30.12 | 99.99 | 99.98 |
| Final Concentrate | .265 | 87.29 | 0.54 | 1.5 | 69.88 | .01 | .02 |

These data show a ratio of concentration of 377.4 to have been obtained.

The total reagent requirements for this operation per ton of copper concentrates treated were:

*Table III*

| Reagent | Lbs. per Ton |
|---|---|
| Sulfuric Acid | 3.12 |
| Sodium Ferrocyanide | 1.098 |
| Sodium Cyanide | 0.75 |

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. A process for recovering molybdenite directly from a flotation concentrate containing a small amount of molybdenite and larger amounts of sulfides of other metals, such as copper and iron, which comprises; subjecting said concentrate to a succession of flotations with a water-soluble, iron-cyanide compound in a mildly alkaline medium, and to a final flotation with a water-soluble cyanide in a strongly alkaline medium.

2. A process for recovering molybdenite from a flotation concentrate containing a small amount of molybdenite and larger amounts of sulfides of other metals, such as copper and iron, which comprises; subjecting said concentrate to a succession of flotations at a pH between 7.5 and 8.5 with a water-soluble, iron-cyanide compound, and to a final flotation at a higher pH with a water-soluble cyanide.

3. A process for recovering molybdenite from a flotation concentrate containing a small amount of molybdenite and larger amounts of copper and iron sulfides, which comprises; subjecting said concentrate to an initial flotation at a pH of between 7.5 and 8.5 with the addition of a water-soluble, iron-cyanide compound, thereafter a plurality of flotation cleaning operations with successive additions of iron-cyanide reagent, and to a final flotation with a water-soluble cyanide at a pH above about 9.0.

4. A process for recovering molybdenite from a flotation concentrate containing a small amount of molybdenite, and larger amounts of copper and iron sulfides, which comprises; subjecting said concentrate to a rougher flotation at a pH of about 7.5 to 8.5 with the addition of sodium ferrocyanide, subjecting the rougher concentrate to several cleaner flotations with additions of sodium ferrocyanide, and subjecting the concentrate from the last cleaner flotation to a final cleaner flotation at a pH of about 9 to 11.5 with the addition of sodium cyanide.

5. A process as defined in claim 4 in which the ferrocyanide reagent is added to the pulp immediately prior to its entrance into flotation cells.

6. A process as defined in claim 4 in which the pulp density in the rougher flotation is of the order of 17 to 25% solids and is lowered during the cleaner flotations.

7. A process as defined in claim 4 in which the pulp density in the rougher flotation is of the order of 17 to 25% solids, in the earlier cleaner flotations is of the order of 8 to 18% solids, and in the final cleaner flotation is of the order of 2 to 3% solids.

8. A process for recovering molybdenite from a copper flotation concentrate containing a small amount of molybdenite and larger amounts of copper and iron sulfides, which comprises; subjecting said concentrate without further treatment to a rougher flotation at a pulp density of 17 to 25% solids and at a pH of between 7.5 and 8.5 with the addition of a water-soluble iron-cyanide reagent, subjecting the rougher concentrate at a lower pulp density but at the same pH to at least one cleaner flotation with further addition of the iron-cyanide reagent, and subjecting the cleaner concentrate to a further cleaner flotation with addition of a water-soluble cyanide at a pH of between 9.0 and 11.5.

9. A process for recovering molybdenite from a copper flotation concentrate containing a small amount of molybdenite and larger amounts of copper and iron sulfides, which comprises; subjecting said concentrate to a rougher flotation at a pulp density of about 17 to 25% solids and a pH of about 7.5 to 8.5 with the addition of a water-soluble, iron-cyanide compound subjecting the rougher concentrate to a plurality of cleaner flotations at a pulp density of about 8 to 18% solids and a pH of about 7.5 to 8.5 with further additions of iron-cyanide reagent and subjecting the cleaner concentrate to a further cleaning at a pH of 9 to 11.5 and pulp density of about 2 to 3% solids with addition of an alkali cyanide.

10. A process as defined in claim 8 in which the cleaner concentrate is dewatered, reground and repulped before the final cleaner flotation.

11. A process as defined in claim 8 in which the tailings from all cleaner flotations are recycled to earlier stages of flotation to provide a closed circuit operation.

12. A process as defined in claim 8 in which the molybdenite concentrate is subjected to counter-current flow in the cyanide cleaning flotation so as to be treated last in the most concentrated cyanide solution.

LYLE M. BARKER.
OREL E. YOUNG.

References Cited in the file of this patent

UNITED STATES PATENTS

| Number | Name | Date |
|---|---|---|
| 1,102,738 | Greenway | July 7, 1914 |
| 1,429,544 | Stevens | Sept. 19, 1922 |
| 1,950,537 | Barthelemy | Mar. 13, 1934 |
| 2,620,068 | Allen et al. | Dec. 2, 1952 |

FOREIGN PATENTS

| Number | Country | Date |
|---|---|---|
| 607,385 | Great Britain | Aug. 30, 1948 |

OTHER REFERENCES

Taggart, Handbook of Mineral Dressing, copyright 1945, by John Wiley & Sons, Inc.; New York city, section 12, pp. 27, 28 and 110.